United States Patent

[11] 3,587,005

| [72] | Inventor | Irvin E. Fair<br>Treasure Island, Fla. |
|---|---|---|
| [21] | Appl. No. | 695,461 |
| [22] | Filed | Jan. 3, 1968 |
| [45] | Patented | June 22, 1971 |
| [73] | Assignee | Bell Telephone Laboratories, Incorporated<br>Murray Hill, N.J. |

[54] TRANSDUCER ARRAY FOR ELASTIC WAVE TRANSMISSION
2 Claims, 3 Drawing Figs.

[52] U.S. Cl....................................................... 333/30, 310/8.1, 310/9.5
[51] Int. Cl.......................................................... H03h 7/00
[50] Field of Search............................................ 333/30, 72, 5; 310/8.1, 8.2, 8.5, 9.5

[56] References Cited
UNITED STATES PATENTS

| 3,300,739 | 1/1967 | Mortley | 333/30 |
| 3,325,743 | 6/1967 | Blum | 330/5 |
| 3,401,360 | 9/1968 | Dubois | 333/30 |
| 3,387,233 | 6/1968 | Parker | 333/30 |
| 3,360,749 | 12/1967 | Sittig | 333/72 |

*Primary Examiner*—Herman Karl Saalbach
*Assistant Examiner*—C. Baraff
*Attorneys*—R. J. Guenther and Arthur J. Torsiglieri ABSTRACT: This application describes an improved transducer array for elastic wave transmission having reduced capacitance and reduced noise. In accordance with the invention, the ground and grating electrodes coextend on opposite sides of the transducer body only over the region coincident with the grating array. In addition, one or both electrodes are adapted to extend around the transducer body in a manner to shield it. By this means, the electrode capacitance and the generation of spurious, nondispersive signals are minimized. The improved structure also permits bonding of both contacts to their respective electrodes thereby producing a more reliable connection to the transducer.

PATENTED JUN22 1971

INVENTOR
I. E. FAIR
BY
Sylvan Sherman
ATTORNEY 3,587,005

TRANSDUCER ARRAY FOR ELASTIC WAVE TRANSMISSION

This invention relates to an improved transducer array for elastic wave transmission.

BACKGROUND OF THE INVENTION

Elastic wave devices using transducer grating arrays are useful in a variety of applications. For example, British Pat. No. 998,102, issued to W. S. Mortley, describes a delay cell utilizing a grating transducer array for use in certain radar systems and in certain spectrometers.

A typical grating delay cell comprises a transmitting transducer array, a body of delay medium and a receiving transducer. The transducer array typically comprises a pair of electrodes, one of which includes a grating array, and a thin, slablike body of transducer material having a pair of broad, parallel surfaces. One of the electrodes, henceforth referred to as the ground electrode, is disposed between the delay medium and the lower parallel surface of the transducer body. The other electrode, which includes the grating region, (henceforth referred to as the grating electrode) is disposed upon the upper parallel surface. The elements of the grating array are so spaced and the array is so positioned with respect to the receiving transducer that elastic waves transmitted by the array reach the receiving transducer with different predetermined delays, depending upon the wave frequency.

One difficulty with prior art delay cells, as will be discussed in greater detail in connection with the prior art device shown in FIG. 1, is the relatively high capacitance associated with the transducer due to fringing effects. In addition, these devices introduce relatively large amounts of spurious signal, i.e., noise, into the system.

SUMMARY OF THE INVENTION

In accordance with the present invention, an improved transducer array is realized by having the two electrodes coextend on opposite sides of the transducer body only over the region coincident with the grating array. In addition, one or both of the electrodes are adapted to extend around the transducer body in a manner to shield it. By this means, the electrode capacitance and the generation of spurious, nondispersive signals are minimized. The resulting structure also permits bonding of both contacts to their respective electrodes thereby producing a more reliable connection to the transducer.

BRIEF DESCRIPTION OF THE DRAWINGS

The invention and its objects and advantages will be more clearly understood from the following detailed description taken in conjunction with the drawings in which.

DETAILED DESCRIPTION

Figure 1:
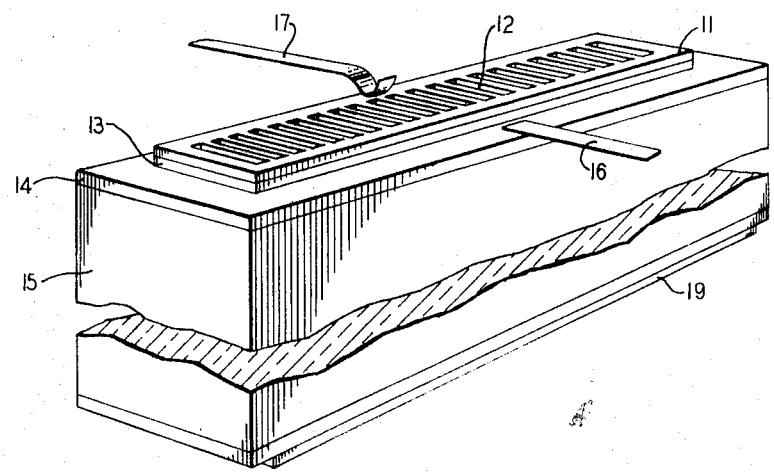
FIG. 1 illustrates a delay cell employing a typical prior art transmitting transducer array.

Referring to the drawings, FIG. 1 shows a delay cell employing a typical prior art transducer array. The delay cell comprises, in essence, a transmitting transducer array 9, a delay medium 15, such as fused quartz, and a receiving transducer 19.

Transmitting transducer array 9 comprises a grating electrode 11, including a grating region 12, and a ground electrode 14 disposed on opposite sides of a thin slablike body of transducer material 13, such as crystalline quartz. Metal electrodes 11 and 14 are typically thin, such as a composite layer of chromium, gold and nickel having a total thickness of the order of 0.8 micron or less.

Grating region 12 of electrode 11 comprises a large number of fine, closely spaced metallic elements whose narrow dimensions and spacings are small compared to a wavelength of an elastic wave in the delay medium. Because this grating array is very fragile, electrode 11 usually includes a portion of metal circumscribing the array in order to ensure elements are not damaged and that they remain properly spaced apart. In a typical transducer, the grating is of the order of a few inches long and a few tenths of an inch wide.

The operation of this prior art device presents a number of practical problems. One of these problems relates to the capacitance added to the transducer array by fringing effects in the region just outside the grating electrode. A second problem is that the fringing fields energize portions of transducer body 13 beyond the grating region producing nondispersive spurious elastic waves which increase the noise level of the delay cell. A third problem is that spring-type contact 17, coupled to grating electrode 11, is relatively unreliable. The more reliable bonding techniques, such as soldering or thermal compression bonding, are not used because heat tends to damage the bond between the transducer body and the electrodes.

Figure 2:
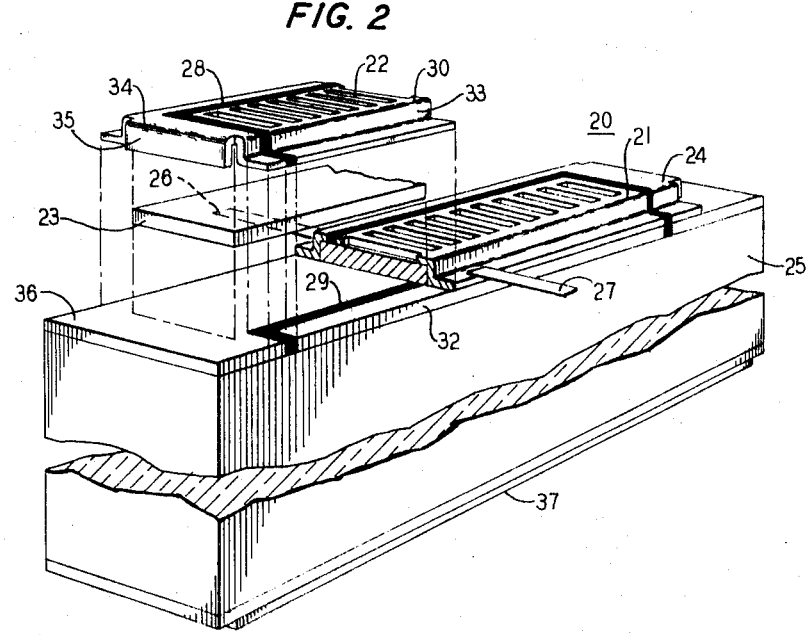
FIG. 2 shows an illustrative embodiment of a delay cell incorporating an improved transmitting transducer array in accordance with the invention.

FIG. 2 is a partially exploded view of a delay cell incorporating an improved transmitting transducer array in accordance with the invention. The delay cell comprises, in essence, an improved transmitting array 20, a delay medium 25 and a receiving transducer 37.

Improved transmitting array 20 comprises a grating electrode 21, including a grating region 22, a transducer body 23, and a ground electrode 24. Grating electrode 21 includes an upper portion 30 disposed upon transducer body 23, a lower portion 32 disposed upon delay medium 25 and extending under transducer body 23, and an edge portion 33. The latter portion extends about one edge of transducer body 23 and connects upper portion 30 of electrode 21 with lower portion 32. Ground electrode 24 also includes an upper portion 34, a lower portion 36 and an edge portion 35 which connects the upper and lower portions.

Figure 3:
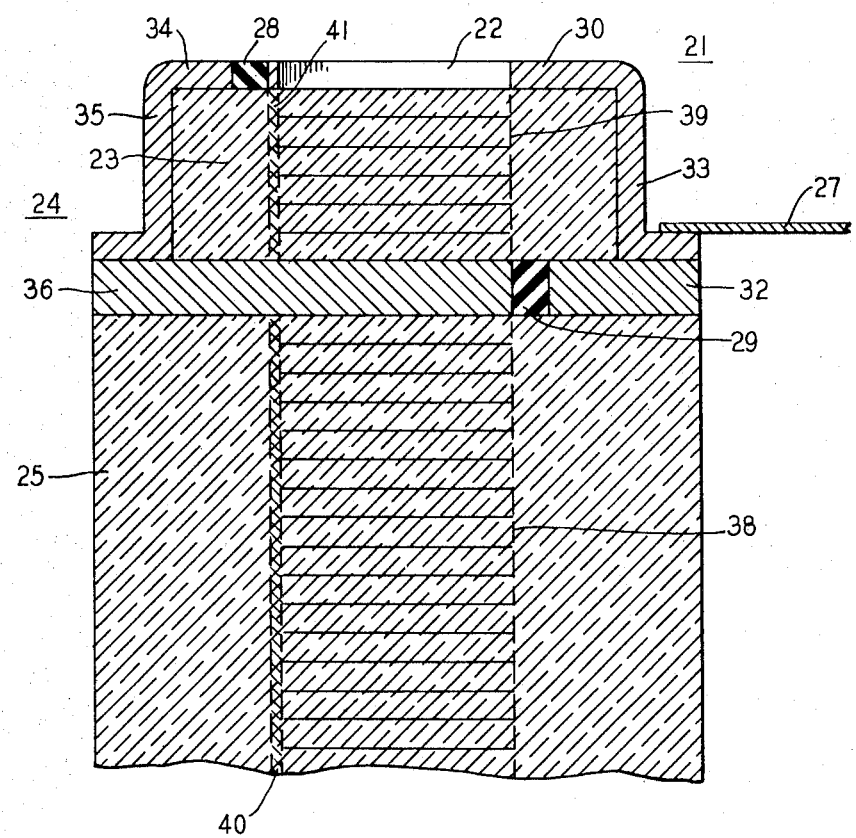
FIG. 3 shows a cross-sectional schematic view of a portion of the same illustrative embodiment of a delay cell incorporating an improved transmitting array in accordance with the invention.

Thin insulating strips 28 and 29 keep the grating and ground electrodes conductively separated. Lower insulating strip 29 is positioned to separate the lower portions 32 and 36 of electrodes 21 and 24, respectively, in such a manner that lower portion 32 of the grating electrode extends under transducer body 23 to the near edge of grating region 22 on the opposite side of the transducer body. Upper insulating strip 28 is positioned to separate the upper portions 30 and 34 of electrodes 21 and 24, respectively, in such a manner that the upper portion 34 of the ground electrode 24 extends over the upper surface of transducer body 23 to approximately the far edge of the two sides of grating region. The structure and operation of this transmitting transducer array can be clearly seen from FIG. 3, which is a cross-sectional schematic view of a portion of the structure shown in FIG. 2. The figure demonstrates that the basic components of the transducer array are grating electrode 21 and ground electrode 24 surrounding transducer body 23, and separated by insulating strips 28 and 29. Moving clockwise around the transducer body beginning at insulating strip 28, it can be seen that grating electrode 21 consists of three sections: an upper portion 30, which includes grating region 22; an edge portion 33; and a lower portion 32. Continuing clockwise from insulating strip 29, the ground electrode 24 is shown to also consist of three regions: a lower portion 36; an edge portion 35; and an upper portion 34.

Thus the two electrodes 21 and 24 are adapted to extend around transducer body 23 so that essentially they coextend only in the region of the grating and shield the transducer body 23 elsewhere to prevent impressing a voltage across body 23 outside the grating region. The result is that except for a small area, 41, the transducer body is driven only in the region below the grating, 39, represented by parallel horizontal lines. The ultrasonic signal in delay medium 25 is likewise limited to the region below the grating, 38, represented by parallel horizontal lines, except for a small region, 40, which is the area of unwanted noise. Thus, by this structure unwanted noise (an ultrasonic signal outside the grating region) is substantially reduced and, in addition, the structure permits electrical contact 27 to be bonded to the grating electrode without damaging the transducer bond.

This transducer array can be conveniently fabricated by forming the lower portions 32 and 36 of electrodes 21 and 24 on delay cell 25, bonding a suitable transducer body 23 in place, and forming the upper portions 30 and 34 of the electrodes on the resulting structures. In particular the lower electrode layers can be formed by depositing a composite layer of metal, such as 0.01 micron of chromium, 0.5 micron of gold, and 0.3 micron of nickel, on a fused quartz delay cell and producing insulating strip 29 by well-known photoetching techniques. If desired, solid insulating material, such as epoxy, can be formed in the strip, but an airgap is adequate for most applications. Strips 28 and 29 are sufficiently wide to ensure against shorts or leakage. In typical applications an airgap 0.3 mm. wide is adequate. A suitable transducer body such as crystalline quartz transducer can be bonded to the metal layer by well-known epoxy bonding techniques. Both the upper portions 30 and 34 and the edge portions 33 and 35 of the electrodes can be formed by depositing a thin layer of metal on the resulting structure, and photoetching both dividing strip 29 and grating array 22. Electrical contacts 26 and 27 can be bonded to the lower portions of electrodes 24 and 21, respectively.

This device has a smaller capacitive reactance and a lower noise level than typical prior art devices. The reduced capacitance arises because the electrodes coextend only in the region of the grating and shield the transducer elsewhere, thus greatly reducing fringing effects. (The capacitance across insulating strips 28 and 29 is negligible because of the thinness of the electrode.) The noise level is reduced for the same reason. The transducer is not driven where it is shielded, and thus, no spurious signal is produced across the shielded regions. Finally, the increased reliability arises from the fact that the shielding permits the grating electrode to be extended away from transducer body 23, thus permitting the use of more reliable bonding techniques such as soldering or thermal compression.

In all cases it is understood that the above-described arrangements are illustrative of only one of the many possible specific embodiments which can represent application of the principles of the present invention. Numerous and varied other arrangements can be readily devised in accordance with these principles by those skilled in the art without departing from the spirit and scope of the invention.

What I claim is:

1. A transducer array for elastic wave transmission comprising:
    a body of transducer material having upper and lower parallel surfaces;
    a first electrode comprising an upper portion including a grating array disposed upon the upper surface of said transducer body, an edge portion extending over an edge of said body, and a lower portion extending over a portion of the lower surface of said transducer body;
    and a second electrode comprising a lower portion extending over a portion of the lower surface of said transducer body which coextends with the upper portion of said first electrode across said transducer body only in said grating region and which extends to cover substantially the remaining portion of said transducer body.

2. An elastic wave delay cell comprising a delay medium in combination with a transducer array according to claim 2 wherein the lower portion of said first electrode extends beyond the edges of said transducer body and contacts the delay medium of said delay cell.